United States Patent
Fan et al.

[11] Patent Number: 6,053,484
[45] Date of Patent: Apr. 25, 2000

[54] DOWNCOMERS FOR VAPOR-LIQUID CONTACT TRAYS

[75] Inventors: Zhongliang L. Fan, Carrollton; Michael J. Binkley, Glenn Heights, both of Tex.

[73] Assignee: Koch-Glitsch, Inc., Wichita, Kans.

[21] Appl. No.: 09/148,354

[22] Filed: Sep. 4, 1998

Related U.S. Application Data

[60] Provisional application No. 60/057,992, Sep. 5, 1997, abandoned, and provisional application No. 60/058,480, Sep. 10, 1997, abandoned.

[51] Int. Cl.[7] .................................................. B01F 3/04
[52] U.S. Cl. ..................................... 261/114.1; 261/114.5
[58] Field of Search ............................. 261/114.1, 114.2, 261/114.3, 114.4, 114.5; 202/158; 203/99

[56] References Cited

U.S. PATENT DOCUMENTS

| | | | |
|---|---|---|---|
| 2,902,413 | 9/1959 | Kassel et al. | 261/114.1 |
| 2,909,414 | 10/1959 | Gerhold et al. | 261/114.1 |
| 2,965,548 | 12/1960 | Hachmuth | 261/114.1 |
| 3,053,521 | 9/1962 | Plaster et al. | 261/114.1 |
| 4,226,678 | 10/1980 | Mende et al. | 261/114.1 |
| 4,504,426 | 3/1985 | Chuang et al. | 261/114 |
| 4,528,068 | 7/1985 | Fiocco et al. | 196/14.52 |
| 4,954,294 | 9/1990 | Bannon | 261/114.1 |
| 5,213,719 | 5/1993 | Chuang | 261/114.1 |
| 5,453,222 | 9/1995 | Lee | 261/114.1 |
| 5,593,548 | 1/1997 | Yeoman et al. | 203/29 |

FOREIGN PATENT DOCUMENTS

| | | |
|---|---|---|
| 0 635 292 A1 | 1/1995 | European Pat. Off. . |
| 1 801 538 | 6/1970 | Germany . |
| 823610 | 1/1960 | United Kingdom . |

*Primary Examiner*—C. Scott Bushey
*Attorney, Agent, or Firm*—Shook, Hardy & Bacon L.L.P.

[57] ABSTRACT

A vapor-liquid contact tray (36) is provided with a tray deck (40) and an upstream downcomer (48) and a downstream downcomer (50) positioned at an opening (46) in the tray deck (40). The upstream downcomer (48) has at least two spaced apart legs (64) extending downwardly at a lower end thereof to carry liquid downwardly. The spacing between the legs (64) allows vapor to flow between the legs (64) so that the upstream downcomer (48) does not completely block the desired vapor flow pattern in the area of the downcomer (48). Each leg (64) includes a deflector (68) extending downwardly from a discharge outlet (66) to shield the discharged liquid from the vapor stream and to deflect the downward momentum of the liquid stream.

22 Claims, 6 Drawing Sheets

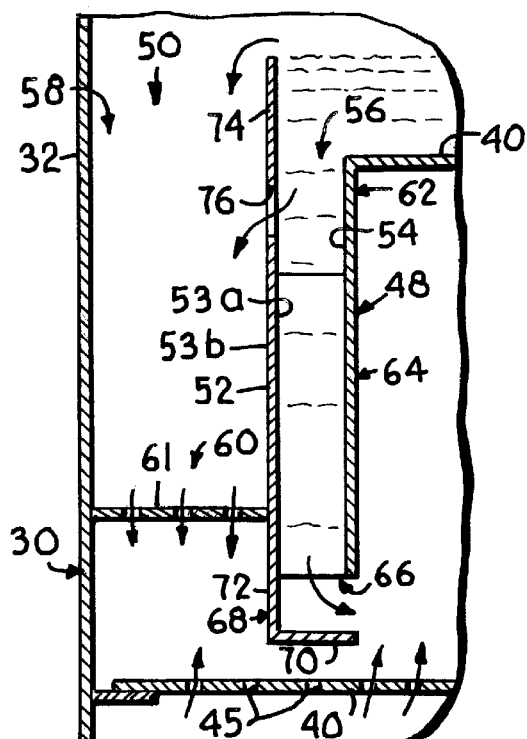
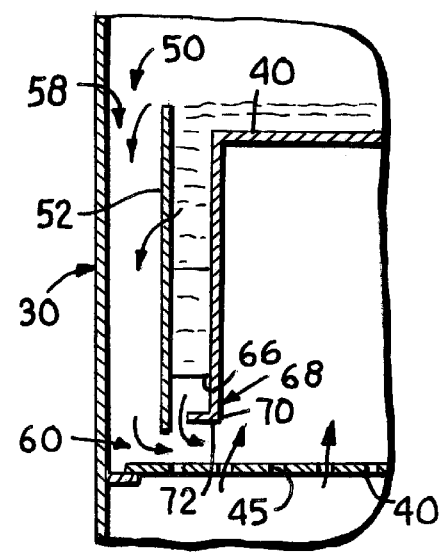
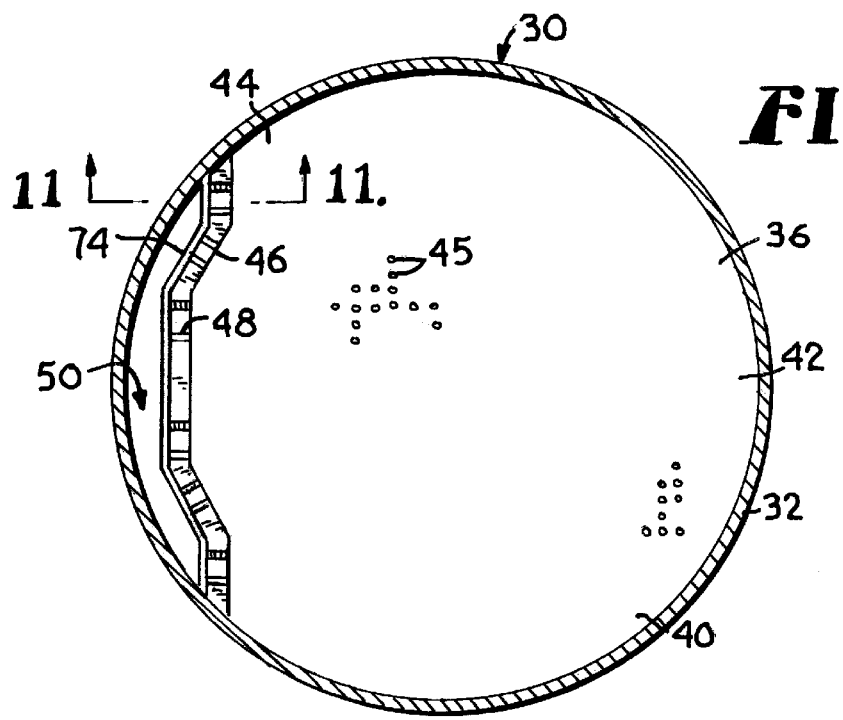

DOWNCOMERS FOR VAPOR-LIQUID CONTACT TRAYS

CROSS-REFERENCE TO RELATED APPLICATIONS

This application claims the benefit of U.S. Provisional Application Ser. Nos. 60/057,992 and 60/058,480 filed on Sep. 5, 1997 and Sep. 10, 1997, respectively, both of which are now abandoned.

STATEMENT REGARDING FEDERALLY SPONSORED RESEARCH

Not applicable.

BACKGROUND OF THE INVENTION

This invention relates in general to mass transfer and exchange columns and, more particularly, to downcomers used in association with vapor-liquid contact trays employed in such columns.

Vapor-liquid contact trays are used in mass transfer or heat exchange columns to facilitate interaction and mass transfer between descending liquid streams and ascending vapor streams. The trays are generally horizontally disposed and vertically spaced apart within an open interior region of the column. Each tray typically includes a flat deck portion that includes a plurality of vapor flow apertures that allow ascending vapor to pass through the tray deck and interact with liquid flowing across the upper surface of the tray deck. A downcomer is positioned at an opening at an outlet end of the tray deck to remove liquid from the deck and direct it downwardly to a liquid receiving area at the inlet end of an underlying tray. The liquid then flows across the tray deck of the underlying tray, interacts with vapor passing through the tray deck, and then flows downwardly through the associated outlet downcomer to the next underlying tray. This flow pattern is then repeated for each successively lower tray.

In conventional columns where high liquid flow rates are encountered, it has been suggested in U.S. Pat. No. 5,213,719 that a second downcomer can be used on each tray to increase the liquid handling capacity of the tray and thereby reduce the opportunity for flooding of the downcomer to occur. The second downcomer, referred to as the upstream downcomer, is positioned adjacent to the downstream downcomer and is shorter than the downstream downcomer in vertical length. FIG. 1, taken from U.S. Pat. No. 5,213,719, illustrates this downcomer construction with the upstream downcomer 10 and downstream downcomer 12 positioned at the outlet end of the tray deck 14.

It has also been suggested, in U.S. Pat. No. 5,453,222, that the normally planar downcomer inlet wall can be shaped in a semi-conical fashion to form a vapor tunnel along the undersurface of the semi-conical wall. The vapor tunnel imparts a horizontal flow vector to the vapor stream and facilitates disengagement of liquid from the vapor stream. FIGS. 2 and 3 are taken from U.S. Pat. No. 5,453,222 and illustrate a tray 16 with a downcomer 18 having a semi-conical inlet wall 20. Venting chambers 22 positioned in the liquid receiving trough 24 on the underlying tray 26 allow vapor to flow through the chambers 22 for upward passage through the overlying vapor tunnel 28 formed by the semi-conical downcomer inlet wall 20.

It would be desirable to combine the advantages afforded by the double downcomer disclosed in the above-mentioned U.S. Pat. No. 5,213,719 with those provided by a downcomer with a semi-conical inlet wall as taught by U.S. Pat. No. 5,453,222 discussed above. Several problems, however, would result from such a combination because the upstream downcomer would need to be of a relatively short vertical dimension so that it does not protrude downwardly into the vapor tunnel and interfere with the desired flow of vapor through the vapor tunnel. If a relatively short upstream downcomer is used, liquid issuing from the bottom of the upstream downcomer would be discharged directly into the vapor stream flowing along the vapor tunnel. The momentum of the vapor stream would cause the discharged liquid to be blown away from the downcomer and across the tray. The vapor-liquid contact and energy and mass exchange occurring in such blowing liquid as it moves through the vapor is not as good as is to be desired. In addition, the blown liquid would bypass portions of the tray deck and would not experience the vapor-liquid interaction that would otherwise occur if the liquid flowed completely across the tray deck. Therefore, it is desirable to minimize or eliminate this effect.

Another untoward effect which may occur as a consequence of utilizing an upstream downcomer is it may "starve" liquid flow from the downstream or primary downcomer under low flow conditions. A further consequence of this effect is that the downstream downcomer may have too little liquid flowing through it and it may lose the liquid seal at the bottom region of the downcomer that blocks undesired entry of vapor into the downcomer. Loss of the liquid seal will allow vapor to flow upwardly through the downcomer and bypass interaction with liquid on the overlying tray. The possibility that such an effect will occur decreases the operating flexibility of the column taken as a whole.

A still further undesirable result from the use of an upstream downcomer of small vertical extent is that liquid issuing from the bottom of the upstream downcomer falls in free-fall vertically downward to the tray deck below. The large momentum of the falling liquid is transmuted into pressure when the liquid hits the tray below and locally depresses the vapor flow in the impact area and, in consequence, allows the liquid to weep through the vapor apertures at that point in the tray deck.

While the foregoing undesirable effects of utilizing an upstream downcomer of short vertical extent have been described in connection with a downcomer system utilizing a vapor tunnel structure, those skilled in the art will appreciate that these undesirable effects can also be encountered when the upstream downcomer is of slight vertical extent, even if there is no vapor tunnel. It would thus be desirable to overcome these disadvantages in a double downcomer system.

BRIEF SUMMARY OF THE INVENTION

It is an object of this invention to provide a vapor-liquid contact tray with a double downcomer constructed in a manner that does not completely block the desired vapor flow pattern in the area of the downcomer, but is able to at least partially shield the liquid discharged from the upstream portion of the downcomer so that the vapor flow does not carry the discharged liquid away from the downcomer and thereby interfere with the desired vapor-liquid interaction in the vicinity of the downcomer.

It is also an object of this invention to provide a double downcomer that does not completely block the desired vapor flow pattern and in which the upstream portion of the downcomer has a sufficient flow resistance so that liquid can accumulate within the upstream portion and overflow into the downstream portion of the downcomer, thereby creating the liquid seal necessary to resist upward vapor flow through the downstream portion of the downcomer.

It is a further object of this invention to provide a double downcomer as described that does not completely block the desired vapor flow pattern but is able to discharge liquid near the surface of the underlying tray deck in a manner that disrupts the downward momentum of the liquid to reduce the incidence of liquid weeping through the vapor flow apertures on the tray deck as a result of such downward momentum.

To accomplish these and other related objects of the invention, a vapor-liquid contact tray is provided, comprising a tray deck having an opening for removing liquid from an upper surface of the tray deck and a plurality of apertures for allowing vapor to flow upwardly through the tray deck to interact with said liquid on the upper surface; an upstream downcomer extending downwardly at said opening in the tray deck and having an inlet at an upper end to receive at least a portion of the liquid entering said opening from the tray deck and at least two spaced apart legs extending downwardly at a lower end, each of said legs having a lower discharge outlet through which at least part of said portion of the liquid exits the upstream downcomer; and a downstream downcomer extending downwardly at said opening in the tray deck and having a lower discharge outlet through which liquid exits the downstream downcomer. At least one orifice can be provided in the upstream downcomer to provide fluid flow communication between the upstream downcomer and the downstream downcomer.

In another aspect, the invention is directed to a method of utilizing the vapor-liquid contact trays to facilitate vapor-liquid interaction.

A primary advantage of the vapor-liquid contact tray is the upstream downcomer allows vapor to pass in the open spaces between legs to preserve at least a portion of the desired vapor flow pattern in the area of the downcomer. The legs and deflector are able to shield the liquid flowing downwardly through the upstream downcomer so that the vapor flow does not carry the discharged liquid away from the inlet end of the tray and thereby interfere with the desired vapor-liquid interaction that occurs as the liquid flows across the tray. In addition, the deflector disrupts the downward momentum of the liquid to reduce the incidence of liquid weeping through the vapor flow apertures on the tray deck as a result of such downward momentum. The upstream downcomer also has a sufficient flow resistance so that liquid can accumulate within the upstream portion and pass through the orifices or overflow the weir and enter the downstream downcomer, thereby creating the liquid seal necessary to resist upward vapor flow through the downstream downcomer.

BRIEF DESCRIPTION OF THE SEVERAL VIEWS OF THE DRAWINGS

In the accompanying drawings which form a part of the specification and are to be read in conjunction therewith and in which like reference numerals are used to indicate like parts in the various views:

FIG. 9 is a side elevation view of a third embodiment of a tray of the present invention taken in vertical section;

FIG. 10 is a top plan view of a fourth embodiment of the vapor-liquid contact tray of the present invention; and FIG. 11 is a side elevation view of the tray shown in FIG. 10 taken in vertical section along line 11—11 in the direction of the arrows.

DETAILED DESCRIPTION OF THE INVENTION

Figure 1:
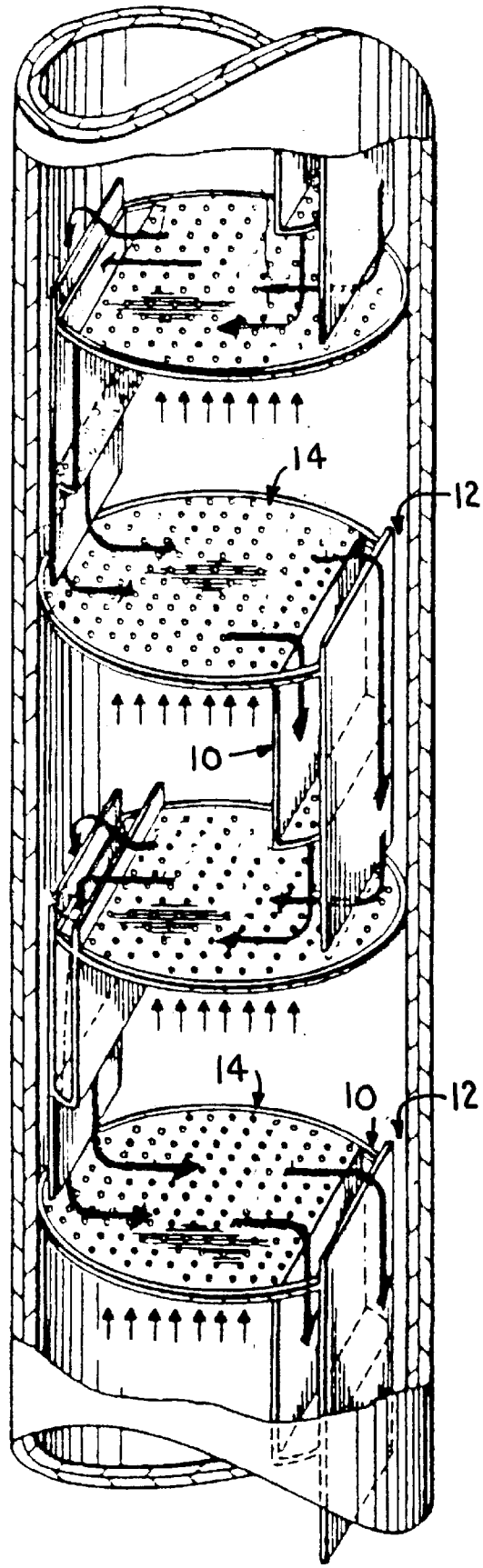
FIG. 1 is a fragmentary perspective view of a prior art mass transfer column employing vapor-liquid contact trays having double downcomers of the type illustrated in U.S. Pat. No. 5,213,719.
Figure 2:
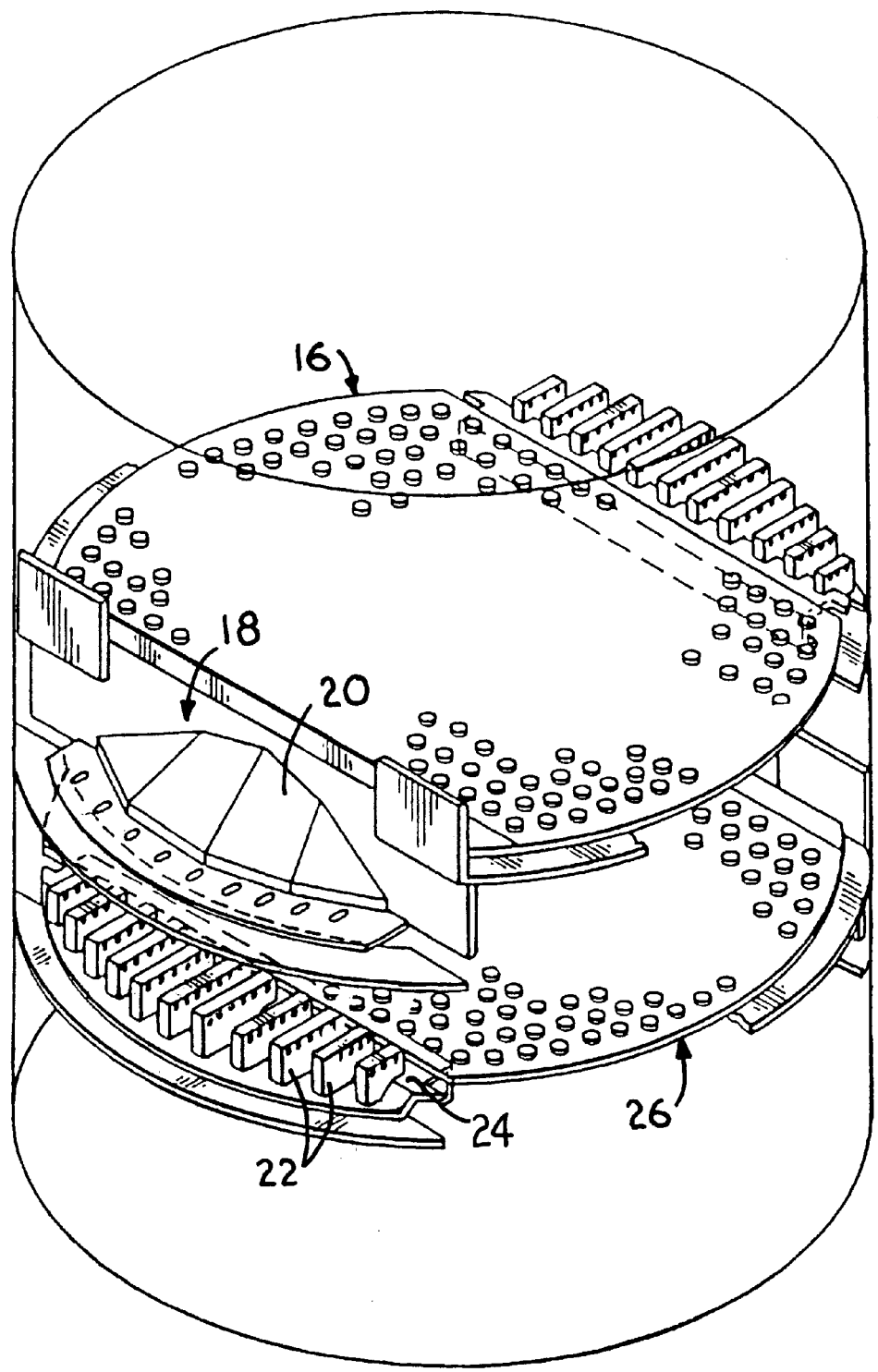
FIG. 2 is a fragmentary perspective view of a prior art mass transfer column employing a vapor-liquid contact tray having a downcomer with a frusto- or semi-conical wall that forms a vapor tunnel to facilitate the upward flow of vapor, all as illustrated in U.S. Pat. No. 5,453,222.
Figure 3:
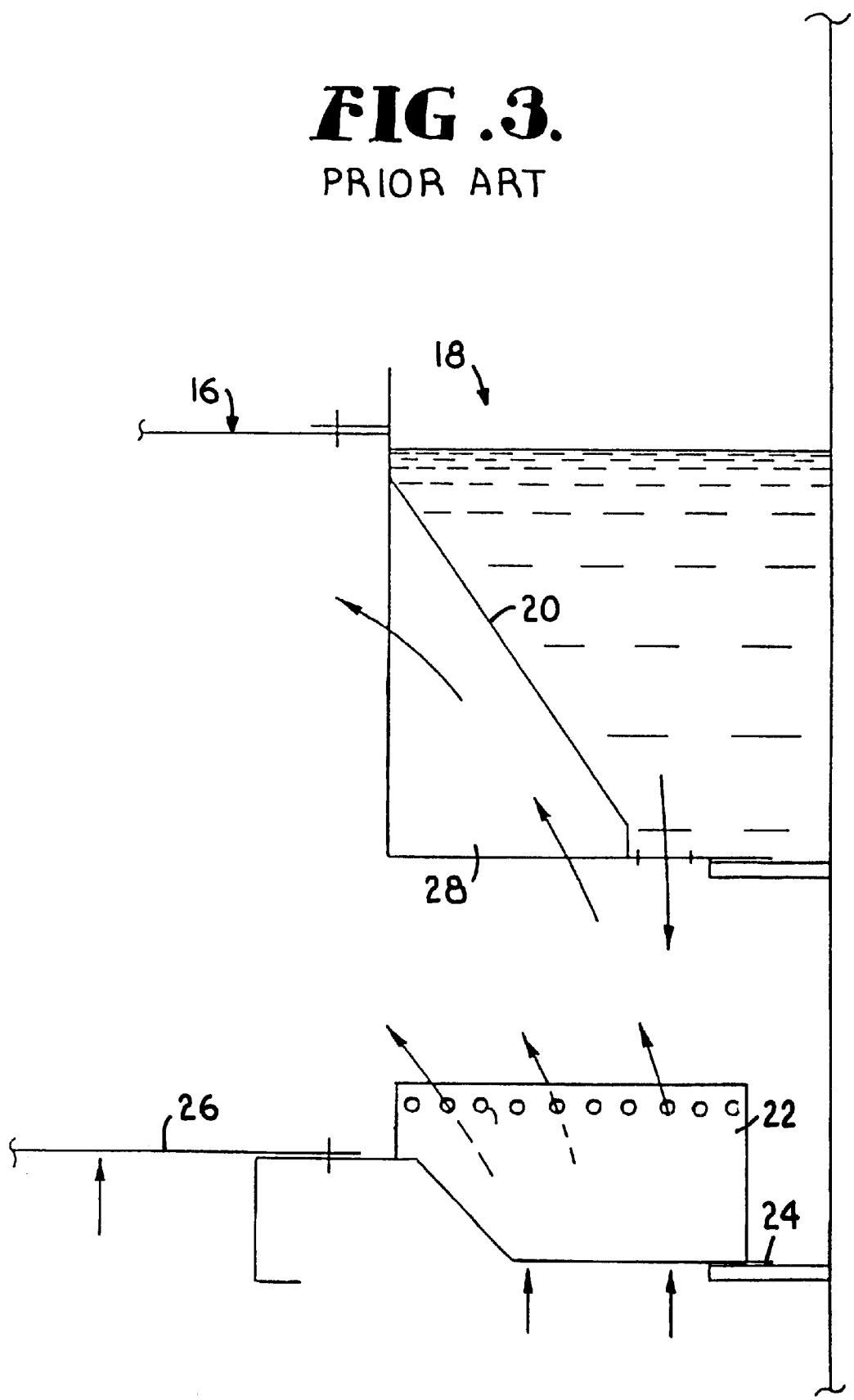
FIG. 3 is a enlarged, fragmentary side elevation view, taken in vertical section, of the prior art contact tray shown in FIG. 2 illustrating the vapor and liquid flow patterns.

Turning now to FIGS. 4–8 in greater detail, a mass transfer or heat exchange column is generally designated by the numeral 30 and includes an upright cylindrical shell 32 that defines an open interior region 34 in which a plurality of vapor-liquid contract trays 36 are contained. Column 30 is of a type used for processing liquid streams and, optionally, vapor streams, typically to obtain fractionation products. Although column 30 is shown in a cylindrical configuration, other shapes, including polygonal, may be used. The column 30 can be of any suitable diameter and height selected for particular applications and can be constructed from any suitably rigid material.

One or more liquid streams can be directed to the column 30 through side stream feed lines and an overhead reflux return line which are not shown in the drawings because of their conventional nature. Likewise, one or more vapor streams can be charged to the column through side stream feed lines (not shown) or can be generated within the column 30. Other conventional aspects of mass transfer columns, such as beds of packing, liquid distributors and collectors, reboilers, condensers and the like are not illustrated but can be included in column 30 to carry out the desired processing of the liquid and vapor streams as they flow in countercurrent relationship through the column.

The vapor-liquid contact trays 36 are placed in vertically spaced apart relationship within the interior region 34 of the column 30 and are supported in a generally horizontal orientation by support rings 38 mounted on the inner surface of the column 30. Each tray 36 includes a tray deck 40 having an inlet end 42 where liquid is introduced onto the tray deck 40 and an outlet end 44 where liquid is removed from the tray deck through an opening 46 in the deck. Apertures 45 are uniformly distributed across the portion of the tray deck known as the "active area." The apertures 45 permit vapor to pass through the tray deck and interact with liquid flowing across the upper surface of the deck. The apertures 45 may comprise holes, valve structures or other conventional fractionation tray apertures and have a size, shape and distribution for the particular operating conditions in which the tray 36 will be utilized. Apertures 45 are typically omitted from the liquid receiving portion of the inlet end 42 of the tray deck 40, but may be present if desired.

Figure 4:
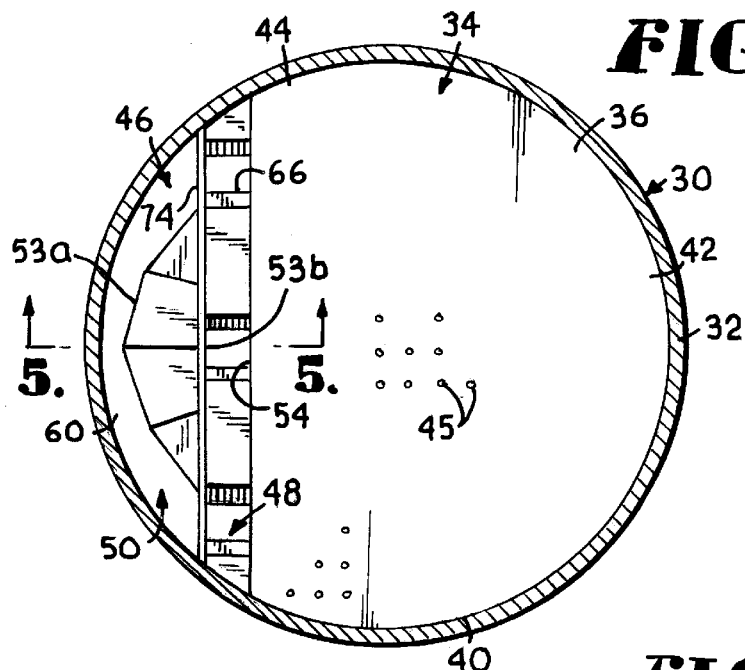
FIG. 4 is a top plan view of a vapor-liquid contact tray constructed according to one embodiment of the present invention.
Figure 5:
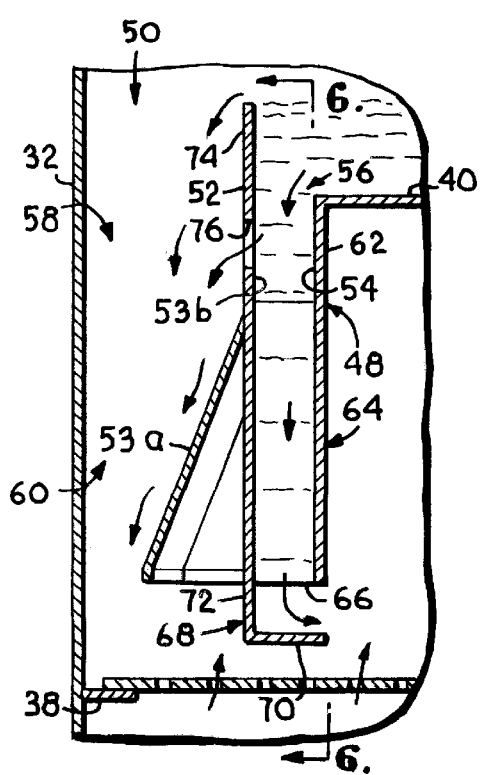
FIG. 5 is a side elevation view of the tray shown in FIG. 4 taken in vertical section along line 5—5 in the direction of the arrows.
Figure 7:
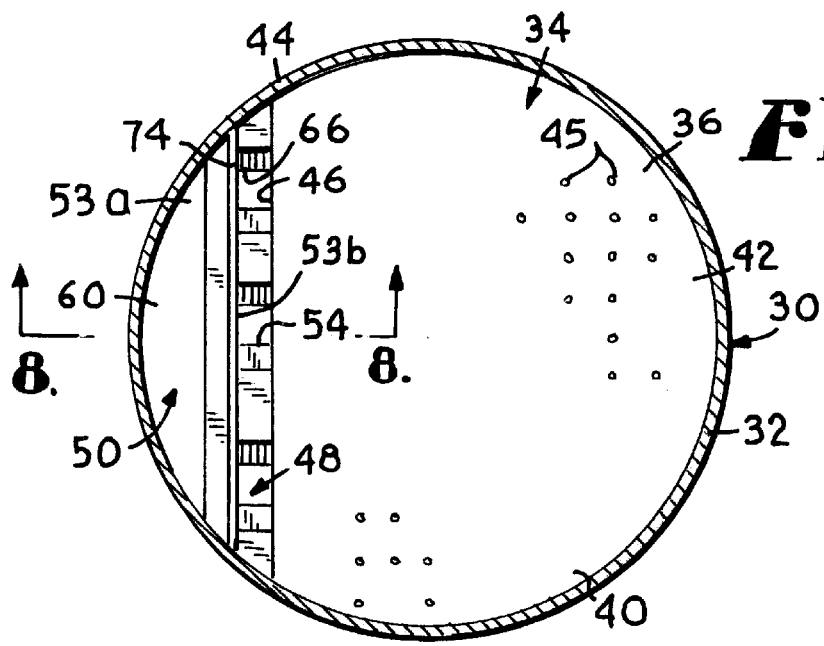
FIG. 7 is a top plan view of a second embodiment of the vapor-liquid contact tray of the present invention.
Figure 8:
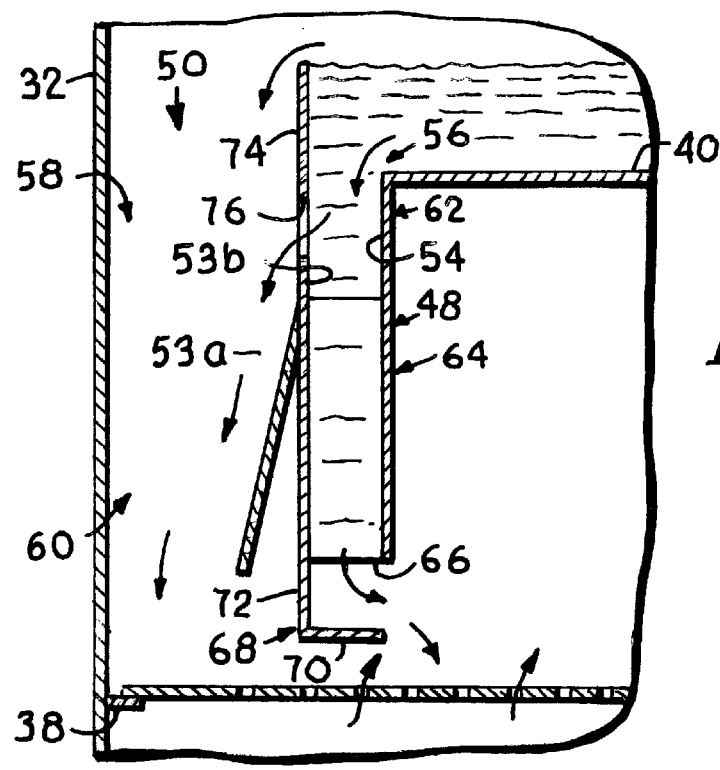
FIG. 8 is a side elevation view of the tray shown in FIG. 7 taken in vertical section along line 8—8 in the direction of the arrows.

At least one, and preferably a plurality, of the trays 36 include an upstream downcomer 48 positioned in the opening 46 at the outlet end 44 of the tray deck 40 and a downstream downcomer 50 positioned adjacent to and downstream from the upstream downcomer in the tray deck opening 46. The downcomers 48 and 50 extend downwardly below the tray deck a preselected distance toward the underlying tray. A partition wall 52 separates the upstream and downstream downcomers 48 and 50 along at least a portion of their lengths and forms at least a portion of an inlet wall 53a for the downstream downcomer and at least a portion of a downstream wall 53b for the upstream downcomer. The partition wall 52 may be a single wall that serves as a common wall for both downcomers or it may be a double, spaced apart wall that permits the downcomers to be spaced apart if desired. That portion of the partition wall 52 that serves as the inlet wall 53a for the downstream downcomer 50 can be semi-conical as illustrated in FIGS. 4–5 or it can planar and sloped as illustrated in FIGS. 7–8. Alternatively, the inlet wall can be vertical as shown in FIG. 9, multi-segmental chordal as shown in FIGS. 10 and 11, curved, or other desired configuration. As a further alternative, the multi-segmented chordal inlet wall 53a shown in FIGS. 10–11 can be sloped rather than vertical.

The upstream downcomer 48 is also formed in part by an inlet wall 54 that can likewise be planar and vertically positioned as illustrated in FIGS. 4–9, or it can be sloped, and/or curved, multi-segmented chordal as shown in FIGS. 10–11, or other desired configuration. The remaining walls of the downcomers are formed by the column shell 32, but separate walls can be used if desired.

The upstream and downstream downcomers 48 and 50 cooperate to remove liquid from the outlet end 44 of the tray deck 40 and direct it downwardly to the inlet end 42 of the underlying tray deck. Both downcomers 48 and 50 have an upper inlet 56 and 58, respectively, through which liquid enters the open top of the downcomer for downward passage therethrough and the downstream downcomer has a discharge outlet 60 through which liquid is discharged onto the inlet end 42 of the underlying tray deck 40. The discharge outlet 60 of the downstream downcomer illustrated in FIGS. 4–5 is semi-circular and is directed substantially onto that portion of the underlying tray deck 40 overlying the support ring 38. Alternatively, the discharge outlet can be chordal in configuration as illustrated in FIGS. 7–9, or multi-segmented as shown in FIGS. 10–11. If desired, a perforated plate 61 can close the discharge outlet 60 of the downstream downcomer 50 as shown in FIG. 9. The plate 61 can be perforated with apertures, openings, slots, directional louvres, or other desired features. Alternatively, the plate 61 can comprise a number of overlapping plate segments that form a plurality of discharge openings in the spacing between the plate segments.

The upstream downcomer 48 comprises a horizontally elongated, box-like upper portion 62 that is open at the top to form the inlet 56 and a plurality of spaced apart conduits or legs 64 that extend downwardly from the upper portion 62 to convey liquid to the underlying tray deck 40. The upper portion 62 preferably extends across the width the column 30 and primarily functions as a liquid collector, but it also functions as a manifold to distribute equal amounts of liquid to the legs 64 or, alternatively, greater amounts of liquid may be channeled to selected legs 64 to facilitate a uniform or other desired liquid flow pattern across the underlying tray deck 40. Other configurations can be utilized for the upper portion 62, but it should be short enough in vertical length so that it does not completely block the horizontal passage of vapor under the upstream downcomer 48.

The legs 64 are of a vertically elongated, box-like configuration, but may also be cylindrical or any other desired shape, and include lower discharge outlets 66 that are spaced a preselected distance above the underlying tray deck 40. Preferably, each leg 64 tapers downwardly so that the horizontal cross-sectional area at the discharge outlet 66 is less than that at the upper end of the legs, thereby allowing a liquid to accumulate within the legs and form a seal against entry of vapor into the discharge outlet.

The number, size and spacing of the legs 64 are selected to accommodate the desired amount of liquid flow while providing sufficient open space between the legs 64 to accommodate the desired amount of vapor flow. Advantageously, the spaced apart legs 64 allow vapor to flow in the spacing between the legs so that the desired vapor flow pattern in the area of the downcomer can be maintained. The liquid within the legs, however, is shielded by the legs 64 from the force of the vapor flow and is conveyed to a preselected distance above the underlying tray deck at the inlet end 42 without disruption caused by vapor flow.

Each leg 64 also includes an L-shaped hood or deflector 68 that extends downwardly below the discharge outlet 66. The horizontally extending portion 70 of the deflector 68 is aligned with the discharge outlet 66 and is sized to deflect the vertically downward momentum of a substantial portion or all of the liquid issuing from the discharge outlet 66. By deflecting the falling liquid in this manner, the force at which the liquid hits the tray below is reduced and liquid is less likely to weep through the vapor apertures at that point in the tray deck. The vertically extending portion 72 of the deflector 68 is positioned to shield the discharged liquid from the prevailing vapor flow and thereby reduce the opportunity for the vapor to blow the liquid across the tray and bypass vapor interaction along portions of the tray deck. As shown in FIGS. 5, 8 and 9, the vertical portion 72 can be positioned between the outlets 60 and 66 and can be formed by a downward extension of the partition wall 52. Alternatively, as shown in FIG. 11, the vertical portion 72 of the deflector 68 can be placed on the opposite side of the outlets 66 and can be formed by a downward extension of the inlet wall 54 of legs 64.

It will be appreciated that the objectives of shielding the discharged liquid from vapor flow and disrupting the downward momentum of the discharged liquid can be achieved using curved, multi-segmented or other shaped deflectors instead of the L-shaped deflector illustrated in the drawings. In addition, the vertical portion 72 of the deflector 68 could be omitted, such as in those applications where the discharge outlets 66 of legs 64 are close enough to the underlying tray deck 40 so that the liquid is discharged directly into the liquid stream flowing from the downstream downcomer discharge outlet 60. The horizontal portion 70 of deflector 68 also could be formed separately from the vertical portion 72 and supported by brackets attached to the column shell 30, the underlying tray deck 40, or other internal components. The foregoing variations are contemplated by and within the scope of the present invention.

A weir 74 separates the downcomer inlets 56 and 58 and causes liquid to fill the upstream downcomer 48 and accumulate to a preselected depth on the tray deck 40 before it overflows the weir and enters the downstream downcomer 50. Alternatively, the weir 74 may be omitted or positioned at the edge of the outlet end 44 of the tray deck 40 so that liquid must spill over the weir to enter the inlet 56 of the upstream downcomer 48. In addition, two weirs 74 could be utilized, with one positioned at the edge of the outlet end 44 of tray deck 40 and the other positioned between the downcomer inlets 56 and 58.

Figure 6:
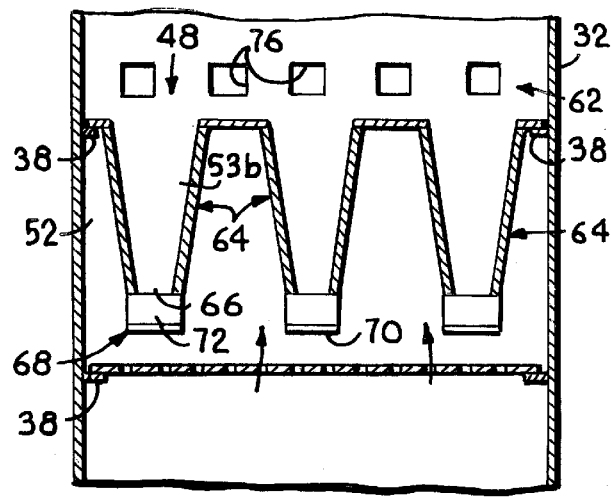
FIG. 6 is an end elevation view of the tray taken in vertical section along line 6—6 of FIG. 5 in the direction of the arrows.

As can best be seen in FIGS. 5–6 and 8, a plurality of spaced apart orifices 76 are provided in the partition wall 52 to allow a portion of the liquid in the upstream downcomer 48 to pass from the upper portion of the upstream downcomer through the partition wall 52 and enter the downstream downcomer 50. The orifices 76 are shown as having a square-shape in the drawings, but they may be round, oval, rectangular, or other desired shape. The number, size, shape and spacing of the orifices are selected to provide sufficient liquid flow into the downstream downcomer 50 to cause liquid to accumulate within the downstream downcomer and thereby maintain a liquid seal at the bottom thereof. The flow resistance provided by the legs 64 of the upstream downcomer 48 also serves to cause liquid to accumulate within the upper portion 62 of the upstream downcomer, thereby helping to ensure that liquid flows through the orifices 76 and into the downstream downcomer 50. Under sufficient liquid flow rates, liquid will accumulate on the tray deck 40 and then overflow the weir 74 and enter the downstream downcomer 50 through its upper inlet 58.

In operation, liquid flows from the inlet end 42 to the outlet end 44 of the tray deck 40 and enters the inlet 56 and the upper portion 62 of the upstream downcomer 48. A portion of the liquid is conveyed downwardly through the legs 64, is discharged through the outlets 66 and is deflected by the L-shaped deflector 68 before it falls onto the underlying tray deck. Another portion of the liquid in the upper portion 62 of the upstream downcomer 48 passes through the orifices 76 and enters the downstream downcomer 50 for downward passage therethrough and discharge onto underlying tray deck. When liquid flow rates increase to a sufficient level, the weir 74 causes liquid to accumulate on the tray deck and ultimately overflow the weir 74 and enter the downstream downcomer. As liquid is accumulating and flowing across the tray deck, vapor passes upwardly through the tray deck and interacts with the liquid on the tray deck.

It can be seen that the upstream downcomer 48 is constructed in a manner that allows vapor to also pass in the open spaces between legs 64 so that it does not completely block the desired vapor flow pattern in the area of the downcomer. The legs 64 and deflector 68, however, are able to shield the liquid flowing downwardly through the upstream downcomer 48 so that the vapor flow does not carry the discharged liquid away from the tray deck 40 and thereby interfere with the desired vapor-liquid interaction on the tray deck. In addition, the deflector 48 disrupts the downward momentum of the liquid to reduce the incidence of liquid weeping through the vapor flow apertures on the tray deck as a result of such downward momentum. The upstream downcomer 48 also has a sufficient flow resistance so that liquid can accumulate within the upstream portion 62 and pass through the orifices 76 or overflow the weir 74 and enter the downstream downcomer 50, thereby creating the liquid seal necessary to resist upward vapor flow through the downstream downcomer.

It will or course be appreciated that the downcomer of the present invention can be used in combination with other tray features such as a raised liquid receiving area and/or louvres or other vapor flow apertures designed to limit while permitting vapor flow through the liquid receiving area.

While the invention has been described with respect to a single pass tray, the invention can be readily adapted for use with multiple pass trays. This is contemplated by and within the scope of the invention.

From the foregoing, it will be seen that this invention is one well adapted to attain all the ends and objects hereinabove set forth together with other advantages that are inherent to the structure.

It will be understood that certain features and subcombinations are of utility and may be employed without reference to other features and subcombinations. This is contemplated by and is within the scope of the claims.

Having thus described the invention, what is claimed is:

1. A vapor-liquid contact tray comprising:

a tray deck having an opening for removing liquid from an upper surface of the tray deck and a plurality of apertures for allowing vapor to flow upwardly through the tray deck to interact with said liquid on the upper surface;

an upstream downcomer extending downwardly at said opening in the tray deck and having an inlet at an upper end to receive at least a portion of the liquid entering said opening from the tray deck and at least two spaced apart legs extending downwardly at a lower end, each of said legs having a lower discharge outlet through which at least part of said portion of the liquid exits the upstream downcomer; and a downstream downcomer extending downwardly at said opening in the tray deck and having a lower discharge outlet through which liquid exits the downstream downcomer.

2. The vapor-liquid contact tray as in claim 1, including at least one orifice in said upstream downcomer to provide fluid flow communication between the upstream downcomer and the downstream downcomer.

3. The vapor-liquid contact tray as in claim 2, including a partition wall separating the upstream downcomer from the downstream downcomer along at least a portion of their lengths, and wherein said orifice is located in said partition wall.

4. The vapor-liquid contact tray as in claim 3, including a plurality of said orifices located in said partition wall.

5. The vapor-liquid contact tray as in claim 1, including at least one deflector positioned below the discharge outlet of one of the legs to deflect the downward momentum of liquid discharged from discharge outlet.

6. The vapor-liquid contact tray as in claim 5, wherein the deflector includes an upper portion extending downwardly from the discharge outlet of said one of the legs to shield the discharged liquid from vapor flowing against said upper deflector portion.

7. The vapor-liquid contact tray as in claim 6, wherein the deflector is generally L-shaped.

8. The vapor-liquid contact tray as in claim 1, wherein said downstream downcomer has a generally semi-conical inlet wall.

9. The vapor-liquid contact tray as in claim 1, wherein said downstream downcomer includes an upper inlet at said opening in the tray deck and wherein a weir is positioned at said opening and separates the inlets for the upstream and downstream downcomers.

10. A vapor-liquid contact tray comprising:

a tray deck having an opening for removing liquid from an upper surface of the tray deck and a plurality of apertures for allowing vapor to flow upwardly through the tray deck to interact with said liquid on the upper surface;

an upstream downcomer extending downwardly at said opening in the tray deck and having an inlet at an upper end to receive at least a portion of the liquid entering said opening from the tray deck and at least two spaced apart legs extending downwardly at a lower end, each of said legs having a lower discharge outlet through which at least part of said portion of the liquid exits the upstream downcomer;

a downstream downcomer extending downwardly at said opening in the tray deck and having an upper inlet at said opening in the tray deck and a lower discharge outlet through which liquid exits the downstream downcomer; and a weir is positioned at said opening in the tray deck and separating the inlets for the upstream and downstream downcomers.

11. The vapor-liquid contact tray as in claim 10, including at least one orifice in said upstream downcomer to provide fluid flow communication between the upstream downcomer and the downstream downcomer.

12. The vapor-liquid contact tray as in claim 11, including a partition wall separating the upstream downcomer from the downstream downcomer along at least a portion of their lengths, and wherein said orifice is located in said partition wall.

13. The vapor-liquid contact tray as in claim 12, including a plurality of said orifices located in said partition wall.

14. The vapor-liquid contact tray as in claim 10, including at least one deflector positioned below the discharge outlet of one of the legs to deflect the downward momentum of liquid discharged from discharge outlet.

15. The vapor-liquid contact tray as in claim 14, wherein the deflector includes an upper portion extending downwardly from the discharge outlet of said one of the legs to shield the discharged liquid from vapor flowing against said upper deflector portion.

16. The vapor-liquid contact tray as in claim 15, wherein the deflector is generally L-shaped.

17. The vapor-liquid contact tray as in claim 10, wherein said downstream downcomer has a generally semi-conical inlet wall.

18. A method of intermixing vapor and liquid streams in a mass transfer column containing a plurality of vertically spaced vapor-liquid contact trays, at least one of said trays having a tray deck containing apertures and an upstream downcomer and a downstream downcomer positioned at an opening in the tray deck, said upstream downcomer having at least two spaced apart legs extending downwardly, said method comprising the steps of:

(a) flowing a liquid stream across the tray deck of said one tray toward said opening;

(b) directing at least a first part of the liquid stream from the tray deck into an inlet in the upstream downcomer at the opening and passing at least some of said first part of the liquid stream downwardly through the legs in the upstream downcomer;

(c) discharging said at least some of said first part of the liquid stream from said legs through a discharge outlet;

(d) directing a second part of the liquid stream from the tray deck, or some of said first part of the liquid stream from upstream downcomer, into the downstream downcomer and passing it downwardly through the downstream downcomer;

(e) passing vapor stream upwardly through said apertures in the tray deck and interacting the vapor stream with the liquid stream on the tray deck; and (f) passing some of said vapor stream through a space between said legs.

19. The method as in claim 18, wherein in said step (d) some of said first part of the liquid stream is directed from the upstream downcomer into the downstream downcomer and is passed downwardly through the downstream downcomer.

20. The method as in claim 18, including causing said liquid stream to accumulate on said tray deck by placing a weir at said opening.

21. The method as in claim 18, including accumulating a portion of said at least some of said first part of the liquid stream in said legs to form a liquid seal to impede upward entry of vapor through said discharge outlet.

22. The method as in claim 21, including accumulating a portion of said second part of the liquid stream from the tray deck, or a portion of said some of said first part of the liquid stream from upstream downcomer, in the downstream downcomer to form a liquid seal to impede upward entry of vapor into the downstream downcomer.

* * * * *